Patented Dec. 13, 1938

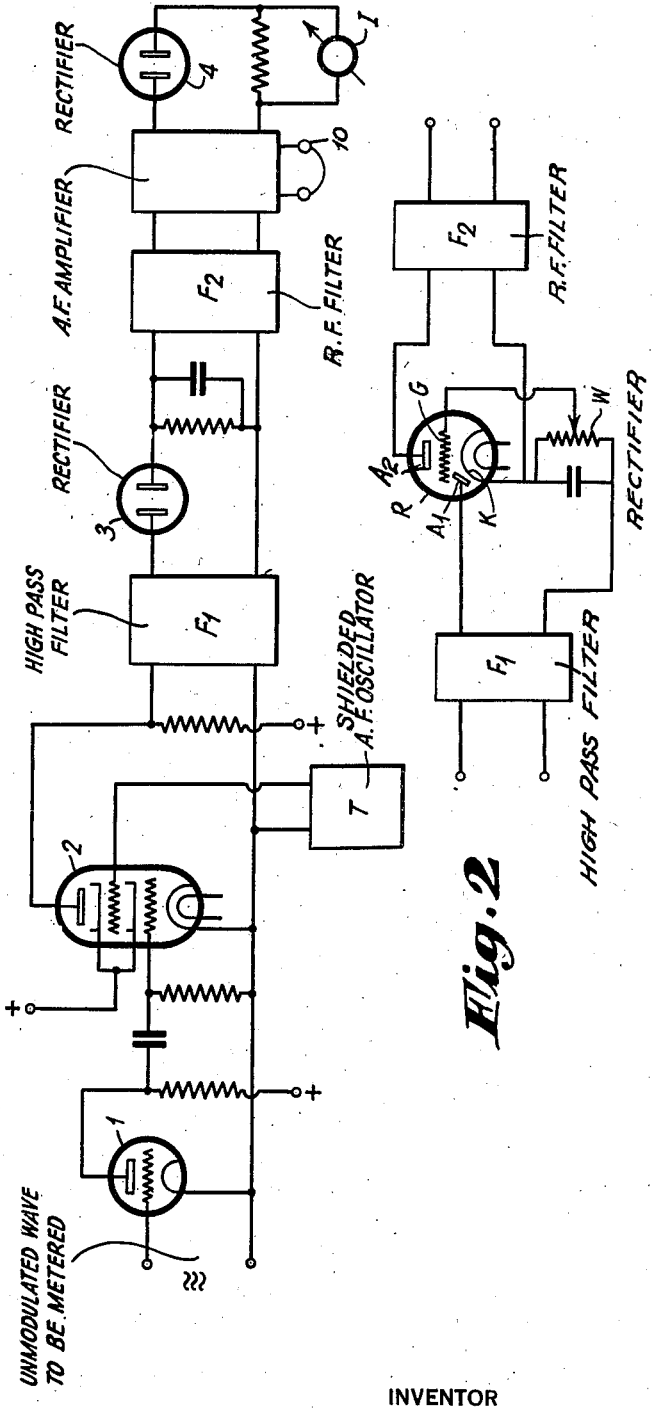

2,140,016

UNITED STATES PATENT OFFICE 2,140,016

WAVE METER

Wolfgang Kautter, Berlin, Germany, assignor to Telefunken Gesellschaft für Drahtlose Telegraphie m. b. H., Berlin, Germany, a corporation of Germany Application September 25, 1937, Serial No. 165,640
In Germany July 24, 1936

2 Claims. (Cl. 171—95)

This application concerns a new and improved means for measuring the amplitude of unmodulated radio frequency wave energy.

The amplitude of unmodulated radio frequency wave energy, according to prior practice, has usually been measured by determining the direct current voltage resulting from rectification of the radio frequency energy. However, for this purpose potentials of at least 0.3 volt is required to produce fairly large kicks or deflections in the instrument thus used. Aperiodic input stages to raise the gain are of but little assistance, for the reason that the plate resistances, for reasons of unavoidable capacitance must be chosen so much lower, the higher the frequencies for which the measuring instrument is to be used. Another disadvantage is that in this type of wave meter simultaneous acoustic observation, say, by a head set is impossible. Because of the inertia and sluggishness of the various types of direct current instruments used for the purpose, a great many and often essential properties of measuring curves of radio frequency voltage waves subject to variation will escape attention.

Now, according to the invention, the radio frequency voltage to be measured, either non-amplified or after slight aperiodic amplification, is modulated with a tonal frequency, and this is followed by demodulation. The amplitude of the audio frequency occurring after demodulation furnishes a measure and criterion for the size of the radio frequency amplitude, and the same may be fed to a measuring instrument, optionally after amplification.

In describing my invention reference will be made to the attached drawing wherein Figure 1 shows diagrammatically an unmodulated wave meter or measuring system and Figure 2 shows details of a rectifier used in the arrangement of Figure 1.

The drawing, Figures 1 and 2, shows an exemplified embodiment of my invention. The radio frequency voltage which is to be measured, after amplification in tube I, is impressed upon the grid of a hexode tube 2. The third grid of the tube 2 is fed from a built-in shielded audio frequency oscillator T with a frequency of around 1000 cycles per second. As a consequence there is set up in the plate circuit of tube 2, in addition to the amplified tonal frequency supplied by T, a radio frequency wave modulated by 1000 cycles per second. A high-pass filter $F_1$ thereupon cuts off the undesired tonal frequency so that what reaches the following rectifier 3 is only the modulated radio frequency wave. This rectifier, has been shown diagrammatically at 3 in Figure 1 but in practice as shown in Figure 2 the rectifier consists preferably of a compound tube, that is, a tube in which a diode and a triode are united in one vessel, because for such a tube there exists no load limit. Hence, what results in the plate circuit is again the tonal frequency, while the simultaneously occurring modulated radio frequency wave is suppressed in the usual way by a radio frequency filter $F_2$. The tonal frequency energy thereupon is amplified in an audio frequency amplifier to any desired extent, and the output, after rectification in audio frequency rectifier tube 4, is read in a measuring instrument I. Since only the frequency of the built-in (or local) oscillator need to be amplified, the amplifier is preferably of the resonant type comprising circuits tuned to the oscillations to be amplified because such an amplifier is less liable to spill over (oscillate), evidences less output hum, and requires a smaller number of tubes. By careful shielding of the first oscillator stage, conditions must be so made that the audio frequency will have no chance to act directly upon the grid of the audio frequency amplifier.

In an arrangement as just indicated, it is feasible to insure an aperiodic radio frequency sensitiveness of around 20 millivolts. Every radio frequency wave appears modulated by energy of 1000 cycles per second of constant amplitude. Hence, such sudden alterations as may arise in the quantity to be measured are readily discernible and traceable in a head set 10 which is included in the outfit.

Figure 2 shows the details of the demodulator or rectifier portion of the circuit organization illustrated in Figure 1. The rectifier comprises a compound tube R rather than a diode 3. From the filter $F_1$ the modulated radio frequency voltages are impressed upon the anode $A_1$ of the rectifier part of the compound tube R and also through a resistance W upon the cathode of this tube. The demodulated voltages are tapped across resistance W and applied to the grid G of the triode part of the said compound tube. The demodulated and amplified voltages which are fed to the filter $F_2$ are taken from the plate or anode $A_2$ and cathode or filament K.

The operation of the measuring scheme hereinbefore disclosed is predicated upon the fact that only as much of the tonal oscillation produced in the input stage of the arrangement is caused to be measured at a point farther along in the circuit as corresponds to the intensity of the radio frequency energy which has been impressed and fed in from the outside.

In order to prevent overloading a compound type tube such as shown in Figure 2 could also be used for the audio frequency rectifier.

I claim:

1. In an arrangement for measuring the amplitude of unmodulated radio frequency wave energy, an electron discharge tube having a plurality of control electrodes and an output electrode, means for impressing the radio frequency wave energy to be measured on a control electrode of said tube, means for impressing low frequency oscillations on a control electrode of said tube to modulate in said tube said radio frequency wave energy, a high pass filter connected to the output electrode of said tube; a linear rectifier coupled to said high pass filter to be excited by modulated wave energy passed thereby, a selective amplifier coupled with said rectifier to amplify the low frequency component derived in the output of said rectifier and rectifying and current indicating means coupled to said amplifier.

2. In an arrangement for measuring the amplitude of unmodulated radio frequency wave energy, an electron discharge tube having a plurality of control electrodes and an output electrode, means for impressing low frequency oscillations on a control electrode of said tube, means for impressing radio frequency wave energy to be measured on a control electrode of said tube whereby said oscillations and wave energy are superimposed or intermodulated, a high pass filter connected to the output electrode of said tube, a combined linear rectifier and electron discharge amplifier device, said amplifier having input and output electrodes, means for coupling the rectifier electrodes of said device to said high pass filter, means coupling the input electrodes of the amplifier of said device to said rectifier electrodes, a selective amplifier having input electrodes coupled to the output electrodes of said amplifier of said electron discharge device, a linear rectifier coupled to the output of said selective amplifier and current indicating means connected with said last named linear rectifier.

WOLFGANG KAUTTER.